(12) United States Patent
Kanetsuku et al.

(10) Patent No.: US 6,195,223 B1
(45) Date of Patent: Feb. 27, 2001

(54) CARTRIDGE INSERTION/DISCHARGE OPENING STRUCTURE OF RECORDING/REPRODUCTION UNIT FOR LIBRARY APPARATUS, AND LIBRARY APPARATUS

(75) Inventors: Toshihito Kanetsuku; Kenichi Utsumi, both of Kawasaki; Takahisa Miyamoto; Naoki Takayama, both of Inagi, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/047,657

(22) Filed: Mar. 25, 1998

(30) Foreign Application Priority Data

Sep. 9, 1997 (JP) ................................ 9-244317

(51) Int. Cl.[7] .......................... G11B 15/68; G11B 17/04
(52) U.S. Cl. ................................ 360/92; 369/178
(58) Field of Search ........................ 360/92; 369/77.2, 369/36, 178, 38

(56) References Cited

U.S. PATENT DOCUMENTS

| | | | |
|---|---|---|---|
| 4,736,356 | * 4/1988 | Konshak | 360/99.02 |
| 4,878,137 | * 10/1989 | Yamashita et al. | 360/98.05 |
| 5,126,898 | * 6/1992 | Komuro et al. | 360/92 |
| 5,126,899 | * 6/1992 | Kanazawa | 360/96.5 |
| 5,172,362 | * 12/1992 | Hattori et al. | 369/77.2 |
| 5,267,105 | * 11/1993 | Morikawa et al. | 360/99.06 |
| 5,532,994 | * 7/1996 | Inoue et al. | 360/77.2 |

* cited by examiner

Primary Examiner—David Davis
(74) Attorney, Agent, or Firm—Greer, Burns & Crain, Ltd.

(57) ABSTRACT

The present invention is for the purpose of allowing a transferring mechanism to certainly carry out the direct insertion/extraction of a cartridge into/from a recording/reproduction unit. For this purpose, in a structure according to this invention, introduction guides (a guide member) for guiding the cartridge to be inserted from the external through an accessor (the transferring mechanism) toward the interior of a deck (the recording/reproduction unit) is provided in a cartridge insertion/discharge opening section of the deck. The introduction guides are formed to have tapered surfaces broadening out from the deck to the external. Further, this invention is applicable to a large-capacity external storage memory storing a large number of cartridges such as magnetic tape cartridges and optical disk cartridges.

30 Claims, 11 Drawing Sheets

CARTRIDGE INSERTION/DISCHARGE OPENING STRUCTURE OF RECORDING/REPRODUCTION UNIT FOR LIBRARY APPARATUS, AND LIBRARY APPARATUS

BACKGROUND OF THE INVENTION

1) Field of the Invention

The present invention relates to a recording/reproduction unit for use in a library apparatus which stores a large number of cartridges such as magnetic tape cartridges and optical disk cartridges, where the unit performs processing such as write/read of recording/recorded data on/from a storage medium accommodated in the cartridge transferred through a transferring mechanism and inserted thereinto, and more particularly relates to a cartridge insertion/discharge opening structure of the recording/reproduction unit, and a library apparatus including this cartridge insertion/discharge opening structure.

2) Description of the Related Art

In general, a library apparatus functions as a large-capacity external storage memory, and a storage rack in its locker stores several thousand of cartridges each accommodating, for example, a magnetic tape as a storage medium, and access such as write/read of recording/recorded data is automatically done toward the storage medium within each of the cartridges.

Furthermore, in addition to the aforesaid storage rack (storage unit) for storing cartridges, the library apparatus is equipped with a station for conducting the entry of a cartridge from the exterior into the apparatus and the exit of the cartridge from the interior of the apparatus to the exterior, a plurality of magnetic tape decks (recording/reproduction units; which will be referred hereinafter to as decks) for conducting access such as write/read of recording/recorded data with respect to a storage medium (magnetic tape) within a cartridge, and an accessor robot (transferring mechanism; which will be referred hereinafter to as an accessor) for performing the conveyance of the cartridges among the cartridge entry/exit station, the storage rack and the decks.

In such a library apparatus, in response to an access request to one cartridge from a host unit or the like, the accessor travels toward the storage rack to search a directing cartridge there, and subsequently, a hand mechanism grips that cartridge and transfers it to the deck for insertion into the deck. With these operations, in that deck, given processing is done with respect to the storage medium (magnetic tape) within the inserted cartridge. After the completion of the processing, the cartridge discharged or ejected from the deck is again gripped by the hand mechanism and conveyed by the accessor up to the storage rack to be stored at a given position.

In a prior library apparatus, a dedicated cartridge delivering and receiving mechanism is installed in each of the decks so that the insertion of the cartridge into the deck or the extraction (pulling-out) of the cartridge from the deck is carried out through the cartridge delivering and receiving mechanism. In this case, the accessor is not designed to directly carry out the insertion/extraction of the cartridge into/from the deck.

In the case that the cartridge delivering and receiving mechanism is provided at every deck, the mounting space enlarges within the library apparatus and the system gets complicated. For this reason, a requirement has arisen for omitting the cartridge delivering and receiving mechanism and for allowing the accessor to directly carry out the insertion/extraction of a cartridge into/from a deck without the intervention of the cartridge delivering and receiving mechanism so that the reduction of the mounting space and the simplification of the system are realizable.

SUMMARY OF THE INVENTION

The present invention has been developed with a view to eliminating these problems, and it is therefore an object of this invention to provide a cartridge insertion/discharge opening structure of a recording/reproduction unit for a library apparatus and a library apparatus which allow a transferring mechanism to certainly conduct the direct cartridge insertion/extraction operations into/from the recording/reproduction unit, thus realizing the reduction of the mounting space and the simplification of the system.

For this purpose, in accordance with the present invention, there is provided a cartridge insertion/discharge opening structure of a recording/reproduction unit for use in a library apparatus storing cartridges each accommodating a storage medium, the recording/reproduction unit conducting recording/reproduction processing toward the storage medium within the cartridge transferred by a transferring mechanism, wherein the cartridge insertion/discharge opening structure serving for the insertion/discharge of the cartridge comprises a guide member for guiding the cartridge to be inserted from the external through the transferring mechanism toward the interior of the recording/reproduction unit, with the guide member being provided in a cartridge insertion/discharge opening section of the recording/reproduction unit, and being formed to have a tapered surface broadening out from the recording/reproduction unit side to the external.

In addition, in accordance with this invention, there is provided a library apparatus comprising a storage rack for storing cartridges each accommodating a storage medium, a recording/reproduction unit for conducting recording/reproduction processing toward the storage medium within the cartridge, and a transferring mechanism for transferring the cartridge between the storage rack and the recording/reproduction unit, wherein a guide member for guiding the cartridge to be inserted from the external through the transferring mechanism toward the interior of the recording/reproduction unit is provided in a cartridge insertion/discharge opening section of the recording/reproduction unit, and the guide member is formed to have a tapered surface broadening out from the recording/reproduction unit side to the external.

In the above-mentioned constitution, a tapered surface widening toward the external is formed on the guide member, that is, when viewed from the transferring mechanism side, the compartment for the insertion of the cartridge into the recording/reproduction unit is made to be in an enlarged condition. Whereupon, even if a positional discrepancy somewhat occurs between the cartridge transferred through the transferring mechanism and the cartridge insertion/discharge opening section of the recording/reproduction unit, after coming into contact with the guide member, the cartridge can be inserted into the cartridge insertion/discharge opening section while being guided by the tapered surface. This permits the cartridge to be directly inserted from the transferring mechanism into the recording/reproduction unit.

In this case, it is also appropriate that the guide member is integrally equipped with a reference flag to be used to make the transferring mechanism recognize the position of the cartridge insertion/discharge opening section. Whereupon, the transferring mechanism can find the position of the cartridge insertion/discharge opening section through the use of the reference flag with a high accuracy.

Furthermore, it is also possible that the guide member and the reference flag are fitted integrally to a base member attached to the cartridge insertion/discharge opening section. That is, in a way of only fitting the base member, integrally bearing the guide member and the reference flag in advance, to the cartridge insertion/discharge opening section, the guide member and the reference flag can both simultaneously and accurately be placed at given positions with respect to the cartridge insertion/discharge opening section.

Still further, it is also possible that a detent mechanism is provided to lock a cartridge discharged from the recording/reproduction unit to prevent it from jumping out from the opening section to the external. This detent mechanism prevents the cartridge from jumping out to the external or from dropping due to vibrations or the like.

In this arrangement, the detent mechanism is composed of a locking member located to protrude from the guide member to the cartridge side for locking the cartridge and a biasing member for biasing the locking member to the cartridge side, and the biasing force of the biasing member is set so that the locking member is put out of the way (retreated) at the insertion/extraction of the cartridge by the transferring mechanism while the locking member locks the cartridge at the discharge of the cartridge by the recording/reproduction unit.

With this constitution, when discharging the cartridge from the interior of the recording/reproduction unit, the locking member receiving the biasing force of the biasing member is not completely put out of the way, so that the cartridge is locked with the locking member to be prevented from jumping out to the external or from dropping due to vibrations. On the other hand, at the extraction of the cartridge by the transferring mechanism, the locking member is completely put out of the way against the biasing force of the biasing member, thus permitting the insertion/extraction of the cartridge without any trouble.

Moreover, when discharging the cartridge from the recording/reproduction unit, the detent mechanism can also be used to function as a positioning mechanism for placing the cartridge at an appropriate extraction position where the transferring mechanism can carry out the extraction of the cartridge. In this case, since it is possible to position the cartridge at a constant pulling-out position, the transferring mechanism can surely pull out the cartridge coming from the recording/reproduction unit.

Thus, a cartridge insertion/discharge opening structure of a recording/reproduction u nit for a library apparatus, and a library apparatus according to this invention can offer the following effects and advantages.

(1) Even though a difference in position somewhat occurs between the cartridge transferred through the transferring mechanism and the cartridge insertion/discharge opening section of the recording/reproduction unit, the cartridge can securely be inserted into the cartridge insertion/discharge opening section while being guided by the tapered surface of the guide member after coming into contact with the guide member, with the result that the insertion of the cartridge into the recording/reproduction unit is directly possible through the transferring mechanism without the intervention of the cartridge delivering and receiving mechanism therebetween.

Accordingly, there is no need for the positioning accuracy of the cartridge with respect to the deck to be enhanced up to a high value, which allows the library apparatus to have a low-cost and compact constitution. In more detail, since the direct insertion/extraction of the cartridge into/from each of the decks is feasible irrespective of the dimension of the library apparatus not being set with a high accuracy, it is possible to realize a library apparatus of the type coupling a plurality of lockers to each other, and further to provide the library apparatus at an extremely low cost.

(2) Since the transferring mechanism can recognize the position of the cartridge insertion/discharge opening section with a high accuracy through the use of the reference flag, the transferring mechanism can certainly carry out the insertion/extraction of the cartridge into/from the recording/reproduction unit without the intervention of the cartridge delivering and receiving mechanism.

(3) In a way of merely fitting the base member previously integrated with the guide member and the reference flag to the cartridge insertion/discharge opening section, the guide member and the reference flag can both concurrently be disposed at given positions relative to the cartridge insertion/discharge opening section, which enables the extremely easy realization of the structure according to this invention.

(4) Since the use of the detent mechanism can surely prevent the cartridge from jumping out to the external at the discharge of the cartridge or from dropping due to vibrations or the like, the transferring mechanism can surely perform the direct extraction of the cartridge from the recording/reproduction unit without the intervention of the cartridge delivering and receiving mechanism.

(5) Now that the detent mechanism comprises the locking member and the biasing member and the biasing force of the biasing member is set to an appropriate value, the insertion/extraction of the cartridge is achievable by the transferring mechanism without any troubles while surely preventing the cartridge from jumping out to the external at the discharge of the cartridge or from dropping due to vibrations or the like. Accordingly, without the intervention of the cartridge delivering and receiving mechanism, the transferring mechanism can securely accomplish the direct insertion/extraction of the cartridge into/from the recording/reproduction unit.

(6) When the detent mechanism is used to function as a positioning mechanism to place the cartridge at a constant extraction position, with no intervention of the cartridge delivering and receiving mechanism, the transferring mechanism can surely pull out the cartridge exiting from the recording/reproduction unit.

(7) With the extremely simple structure whereby the transferring mechanism can certainly accomplish the direct cartridge insertion/extraction into/from the recording/reproduction unit, eliminable is the need for the cartridge delivering and receiving mechanism to be provided at every recording/reproduction unit. Instead, the hand mechanism is capable of directly conducting the insertion/extraction of the cartridge into/from each of the recording/reproduction units, thus resulting in greatly contributing to the size reduction (the reduction of the mounting space and the simplification of the system) and the decrease in cost of the library apparatus.

DESCRIPTION OF THE PREFERRED EMBODIMENTS

An embodiment of the present invention will be described hereinbelow with reference to the drawings.

First of all, referring to FIG. 2, a description will be made hereinbelow of the entire arrangement of a library apparatus to which this embodiment is applicable.

Figure 2:
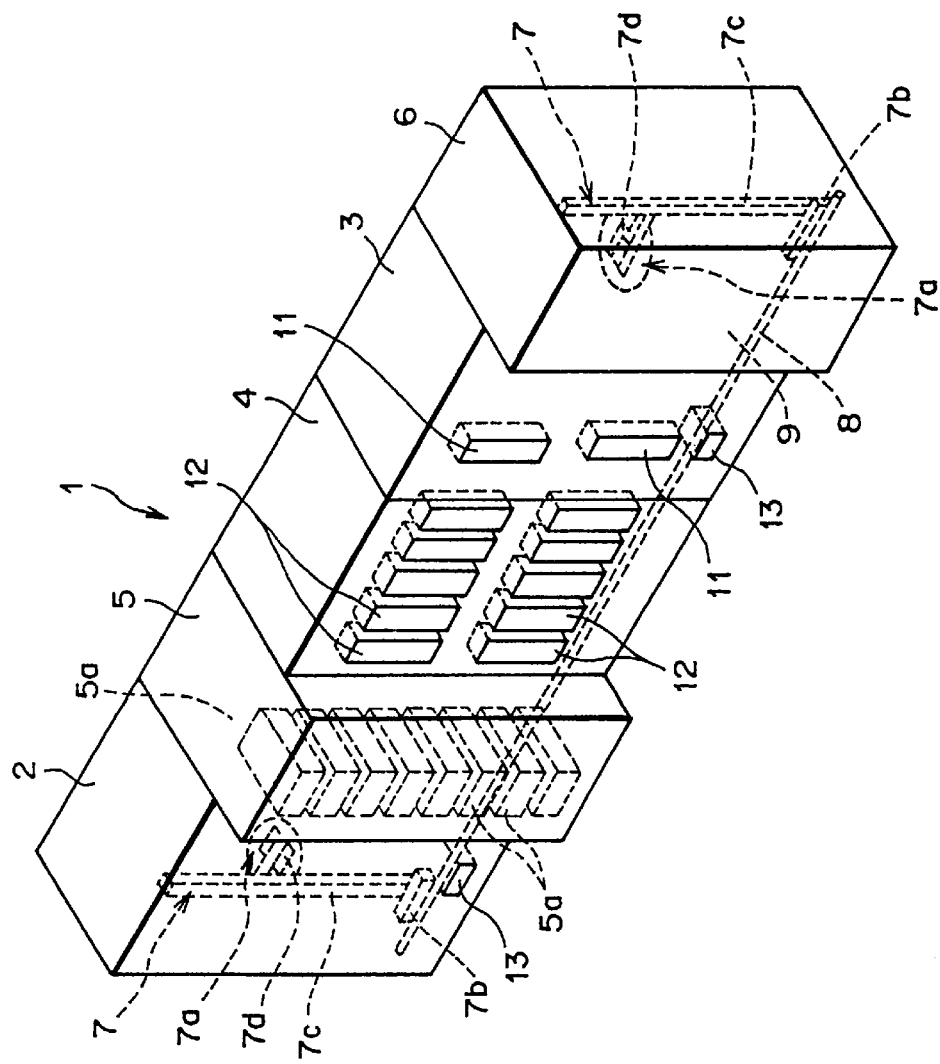
FIG. 2 is a perspective view illustratively showing the entire arrangement of a library apparatus to which this embodiment is applicable.

FIG. 2 is a perspective view illustratively showing the entire constitution of a library apparatus to which this embodiment is applicable. As shown in FIG. 2, a library apparatus 1 involving this embodiment stores a large number of magnetic tape cartridges 10 (see FIGS. 7 to 11; cartridges each accommodating a magnetic tape as a storage medium) and conducts access such as write/read of recording/recorded data toward each of the magnetic tape cartridges 10.

The library apparatus 1 is composed of, for example, left and right (two) accessor units (which will be referred hereinafter to as LAU, RAU, respectively) 2, 3, a cartridge storage unit (which will be referred hereinafter to as a CSU) 4, a tape drive mount unit (which will be referred hereinafter to as a TMU) 5, and an accessor extend unit (which will be referred hereinafter to as an AEU) 6, which are in a connected relation to each other. Also included in the apparatus 1 are accessor robots (transferring mechanisms; which will be referred hereinafter to as accessors) 7 which are located on the left and right sides, respectively, and which move within these units 2 to 6 to transfer the cartridges 10.

The LAU 2 and RAU 3 function as garages for the accessors 7, respectively, and on the front side of the RAU 3 (the external space side, that is, the side where the operator operates the apparatus) there are provided a pair of upper and lower cartridge entry/exit stations [each of which will b e referred hereinafter to as a CAS (Cartridge Access Station)] 11, 11 for carrying out the entry or exit of the cartridge 10 into or from the library apparatus 1 and a cartridge forced exit station (FES) 13 for forcedly discharging a defective cartridge to the external. In addition, another FES 13 is placed on the front side of LAU 2.

The CSU4 stores a large number of cartridges 10, and in this embodiment, five cartridge direct entry/exit stations (each of which will be referred hereinafter to as a DEE) 12 are set on the upper side and five DEEs 12 on the lower side, ten in total. In each of the DEEs 12, a magazine (not shown) storing a plurality of cartridges 10 is set in order to permit the simultaneous entry or exit of the plurality of cartridges 10 into or from the library apparatus 1.

Furthermore, a storage rack (not shown) having a large number of cells for storing a large number of cartridges 10 is placed on an inner wall surface of each of the LAU 2, RAU 3 and CSU 4, and the cartridge 10 from the CAS 11 or the DEE 12 is stored in a given cell of the storage rack through the use of the accessor 7.

The TMU 5 has a plurality of (8 in FIG. 2) magnetic tape decks (recording/reproduction units, MTUs; which will be referred hereinafter to as decks) 5a, and each of the decks 5a conducts the write/read processing of recording/recorded data onto/from a magnetic tape within the cartridge 10 transferred by the accessor 7. This invention relates to a cartridge insertion/discharge opening structure for the insertion/discharge of the cartridge 10 into/from each of decks 5a, and the structure and operation thereof will be described herein later with reference to FIGS. 1 and 4 to 11.

The AEU 6 includes a power source (not shown) for supply of an operating power to each of the accessors 7 and a controller (not shown) for control of the accessors 7.

These units 2 to 6 are in a coupled relation to each other and disposed in a state where their rear surfaces (the sides opposite to the above-mentioned front side) are brought into contact with a wall surface or the like, and organize the library apparatus 1. Further, formed in the library apparatus 1 is an operating space (accessor passage) 9 for the accessors 7 which runs through the units 2 to 6, and placed on the bottom surface of this operating space 9 is a rail (X rail) 8 for guiding the respective accessors 7, which allows each of the accessors 7 to move within the operating space 9.

In addition to a hand mechanism 7d for holding the cartridge 10 to perform the insertion/extraction thereof, each of the accessors 7 has a carriage 7b movable in the horizontal directions along the X rail 8 for moving a hand assembly 7a including this hand mechanism 7d up to a given position and a vertical column 7c for vertically guiding the hand assembly 7a on the carriage 7b, which constitute a moving mechanism.

In the library apparatus 1 thus constructed, the cartridge 10 from the CAS 11 or the DEE 12 is gripped and taken out by the hand mechanism 7d of the accessor 7 and is inserted into and stored in a given cell of the storage rack after being carried by the accessor 7 through the operating space 9.

Furthermore, of a large number of cartridges 10 stored in the respective cells of the storage rack, a cartridge(s) 10 specified by a host unit is gripped and pulled out by the hand mechanism 7d of the accessor 7 and then transferred by the accessor 7 through the operating space 9 to the deck 5a of the TMU 5 to be inserted thereinto.

In the deck 5a, after the recording/reproduction processing on/from the magnetic tape housed in the cartridge 10, the cartridge 10 staying within the deck 5a is discharged therefrom and gripped and taken out by the hand mechanism 7d of the accessor 7 and subsequently inserted into and stored in a given cell of the storage rack by the accessor 7 after passing through the operating space 9.

Incidentally, for discharging the cartridge(s) 10 stored in the storage rack to the exterior of the library apparatus 1, the cartridge 10 to be discharged is gripped by the hand mechanism 7d of the accessor 7 to be taken out from the storage rack and then transferred through the operating space 9 to the CAS 11 or the DEE 12 by the accessor 7 to be inserted into a given position (cell) of the CAS 11 or the DEE 12.

Secondly, referring to FIG. 3, a brief description will be taken hereinbelow of an arrangement of the accessor 7 in this embodiment.

Figure 3:
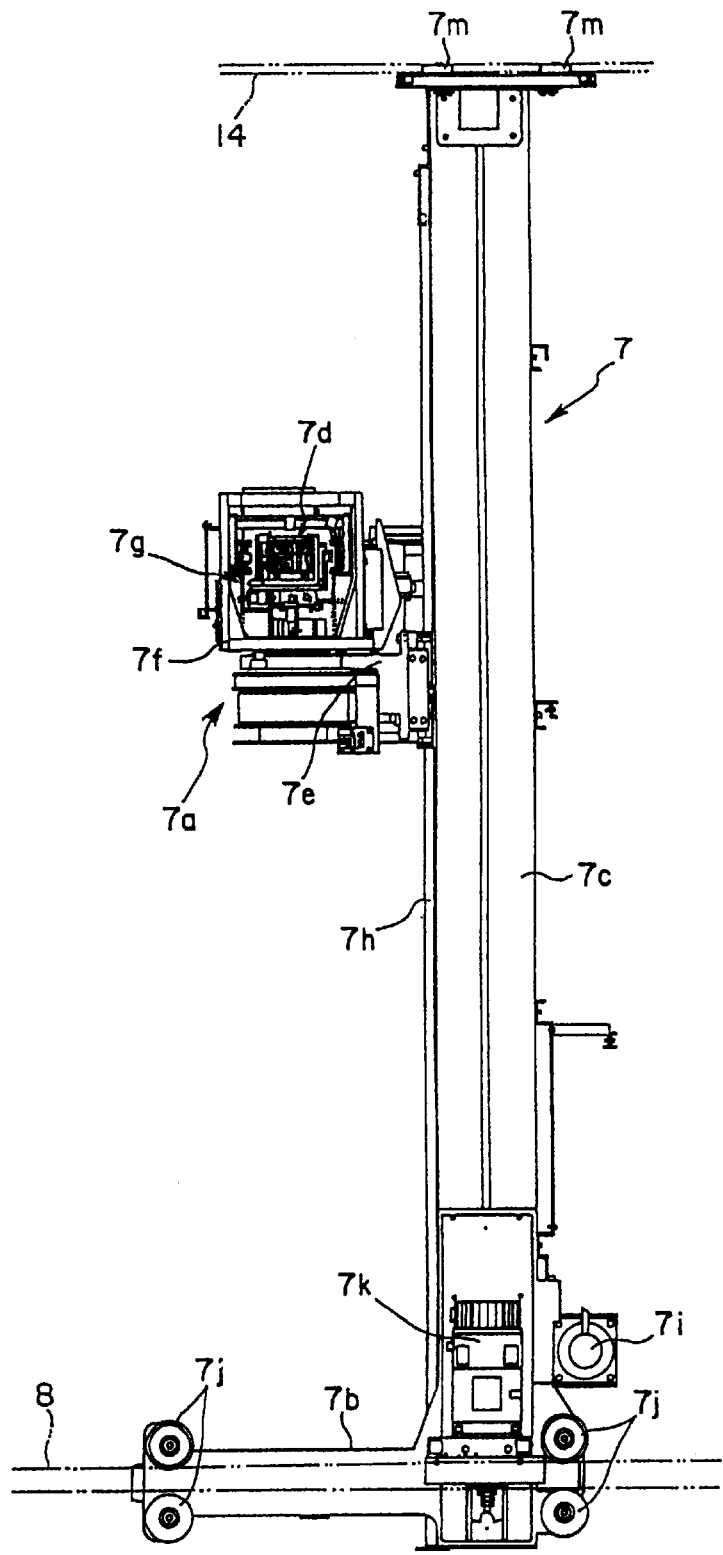
FIG. 3 is a front elevational view showing an accessor in this embodiment.

FIG. 3 is a front elevational view showing the accessor 7 in this embodiment. As shown in FIG. 3, the accessor 7 is, as mentioned before, composed of the hand assembly 7a including the hand mechanism 7d, the carriage 7b and the vertical column 7c.

The hand assembly 7a is constructed in such a manner as to place a picker section 7g including the hand mechanism 7d through a tilt base 7f on a supporting base 7e. The hand mechanism 7d is mounted to be movable in the forward and backward directions with respect to the picker section 7g, and is made to be sliding-driven by a drive mechanism (not shown) in the forward and backward directions. Further, the picker section 7g is mounted on the tilt base 7f to be swingable, and is swingingly driven by a tilt mechanism (not shown) to adjust the cartridge insertion/extraction direction with respect to the horizontal plane. Still further, the hand mechanism 7d, the picker section 7g and the tilt base 7f are set to a supporting base 7e to be revolvable around a vertical shaft by a drive mechanism (not shown).

The supporting base 7e making up the hand assembly 7a is attached to the vertical column 7c to be allowed to slide up and down while being guided by a guide rail 7h fixed vertically along the vertical column 7c. In addition, the supporting base 7e is coupled to a belt (not shown; a belt wound around a pair of pulleys built in upper and lower locations of the vertical column 7c). When this belt is rotationally driven by an elevating drive motor 7i, the supporting base 7e, that is, the whole hand assembly 7a, is vertically shifted to be positioned at a given height.

The carriage 7b is integrally connected to a lower end side of the vertical column 7c and is made to travel along the X rail 8 while supporting the vertical column 7c. Onto the front and rear sides of this carriage 7b, there are pivotally fitted two sets (two pairs) of traveling rollers 7j, 7j each set of which are situated to vertically sandwich the X rail 8 therebetween to be rotatable in accordance with the traveling of the carriage 7b.

Furthermore, the X rail 8 is equipped with a traveling drive rack (not shown) made to extend in its longitudinal directions. In addition, the carriage 7b is provided with a pinion (not shown) rotationally driven by a traveling drive motor 7k.

Still further, a top rail 14 is laid in an upper section of the operating space 9 for the accessor 7 to extend in parallel to the X rail 8. In addition, on the upper end side of the vertical column 7c, there are pivotally fitted two sets (two pairs) of guide rollers 7m, 7m which are situated on the front and rear sides to horizontally sandwich the top rail 14 therebetween to be rotatable in accordance with the traveling of the carriage 7b.

Thus, when the traveling drive motor 7k rotationally drives the pinion, the accessor 7 is wholly moved along the X rail 8 while the pinion and the traveling drive rack gear with each other. Further, when the elevating drive motor 7i revolves the aforesaid belt, the hand assembly 7a is wholly moved up and down along the vertical column 7c. Consequently, the hand assembly 7a (the picker section 7g including the hand mechanism 7d) is shifted up to a given position within a plane including the X rail 8 and the vertical column 7c and positioned thereat.

Referring to FIGS. 1 and 4 to 11, a description will be made hereinbelow of a cartridge insertion/discharge opening structure of each of the decks (recording/reproduction units) which constitutes a feature of this invention.

Figure 1:
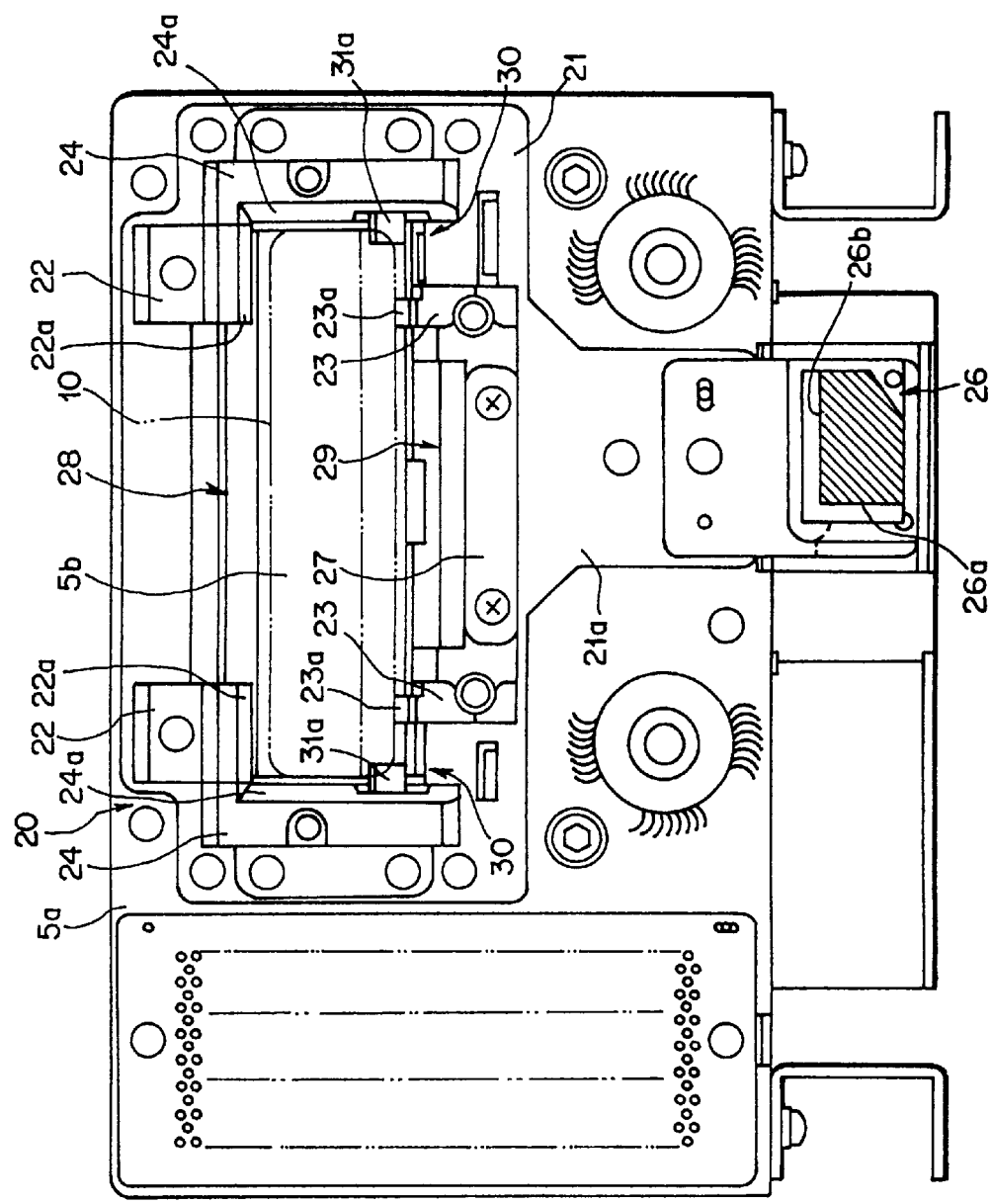
FIG. 1 is a front elevational view showing a recording/reproduction unit (deck) for a library apparatus which includes a cartridge insertion/discharge opening structure according to an embodiment of the present invention.
Figure 4:
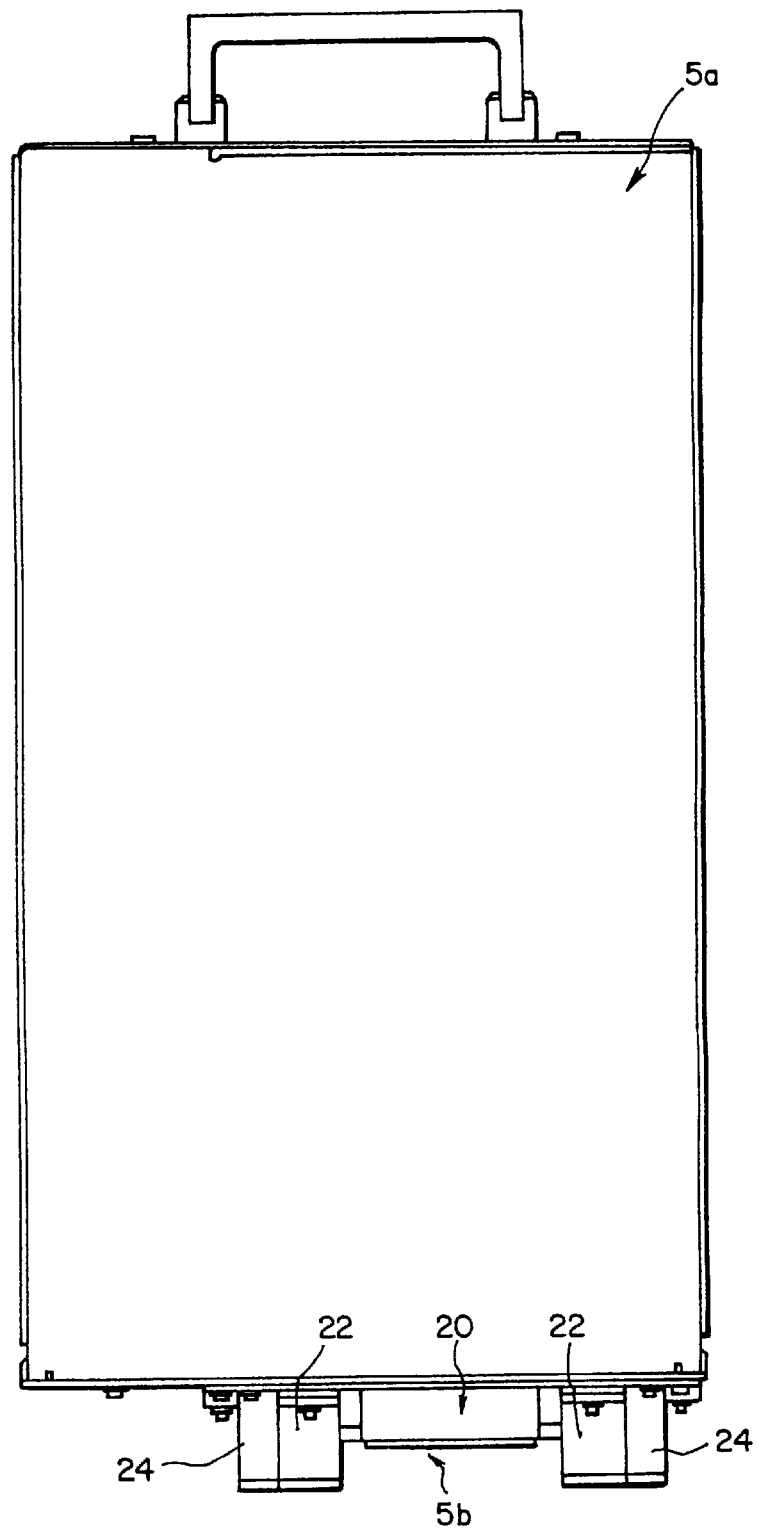
FIGS. 4 and 5 are respectively a plan view and a side elevational view each showing the recording/reproduction unit (deck) for a library apparatus which has the cartridge insertion/discharge opening structure according to this embodiment.
Figure 5:
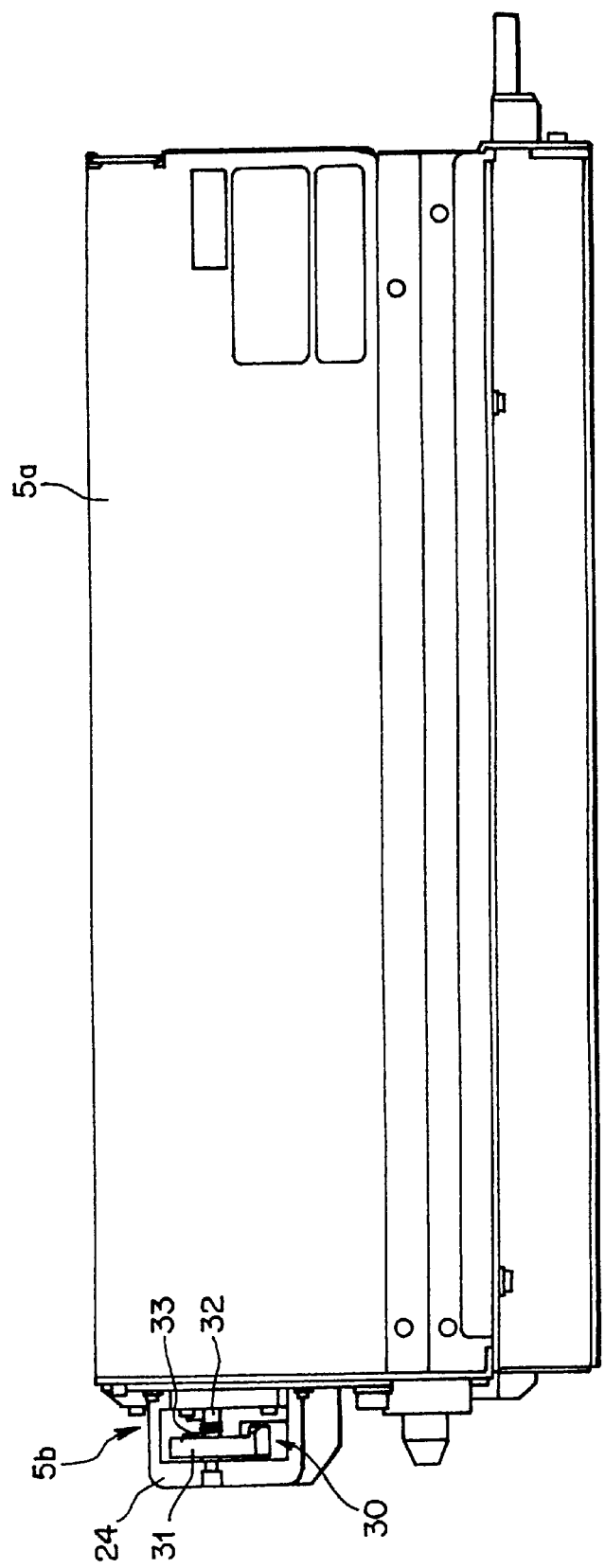
Figure 6:
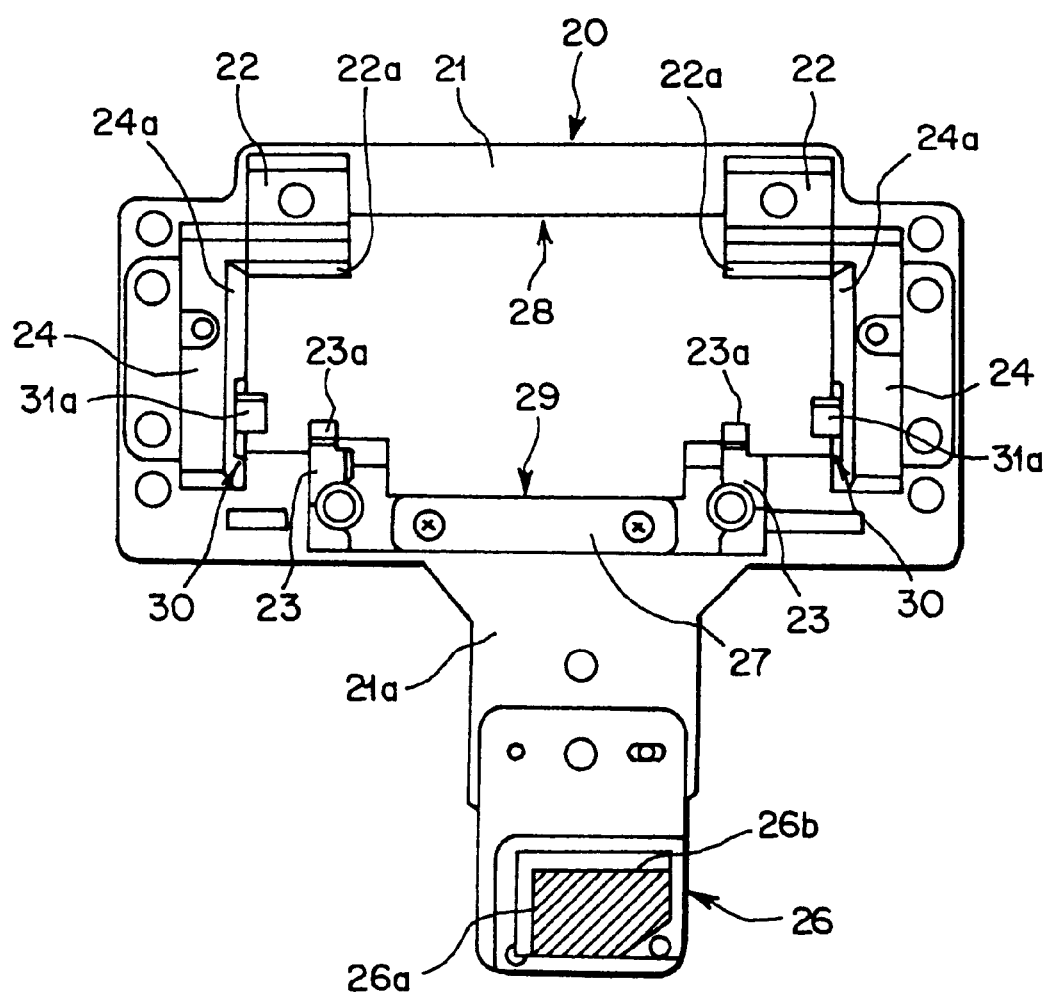
FIG. 6 is a front elevational view showing the cartridge insertion/discharge opening structure according to this embodiment.
Figure 7:
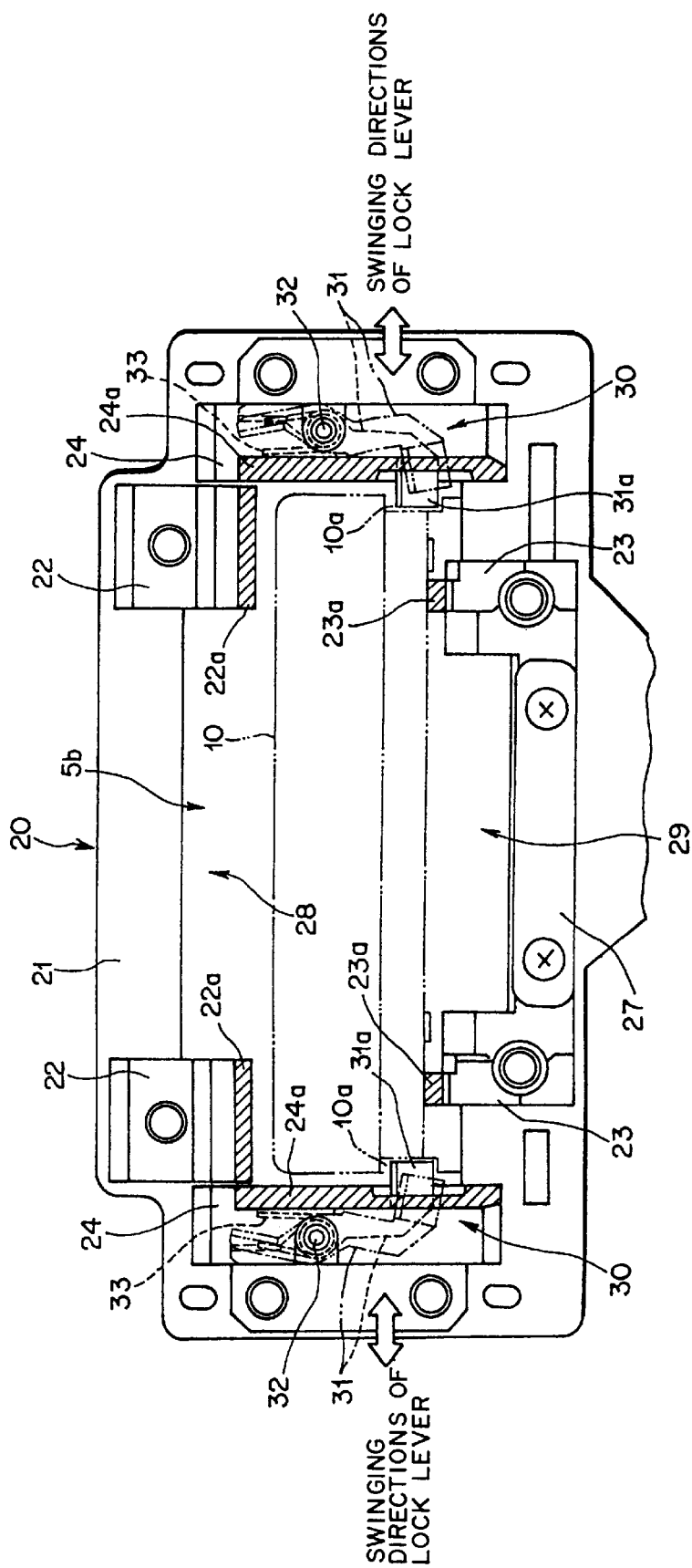
FIGS. 7 and 8 are respectively a front elevational view and a plan view each showing a principal portion of the cartridge insertion/discharge opening structure according to this embodiment.
Figure 8:
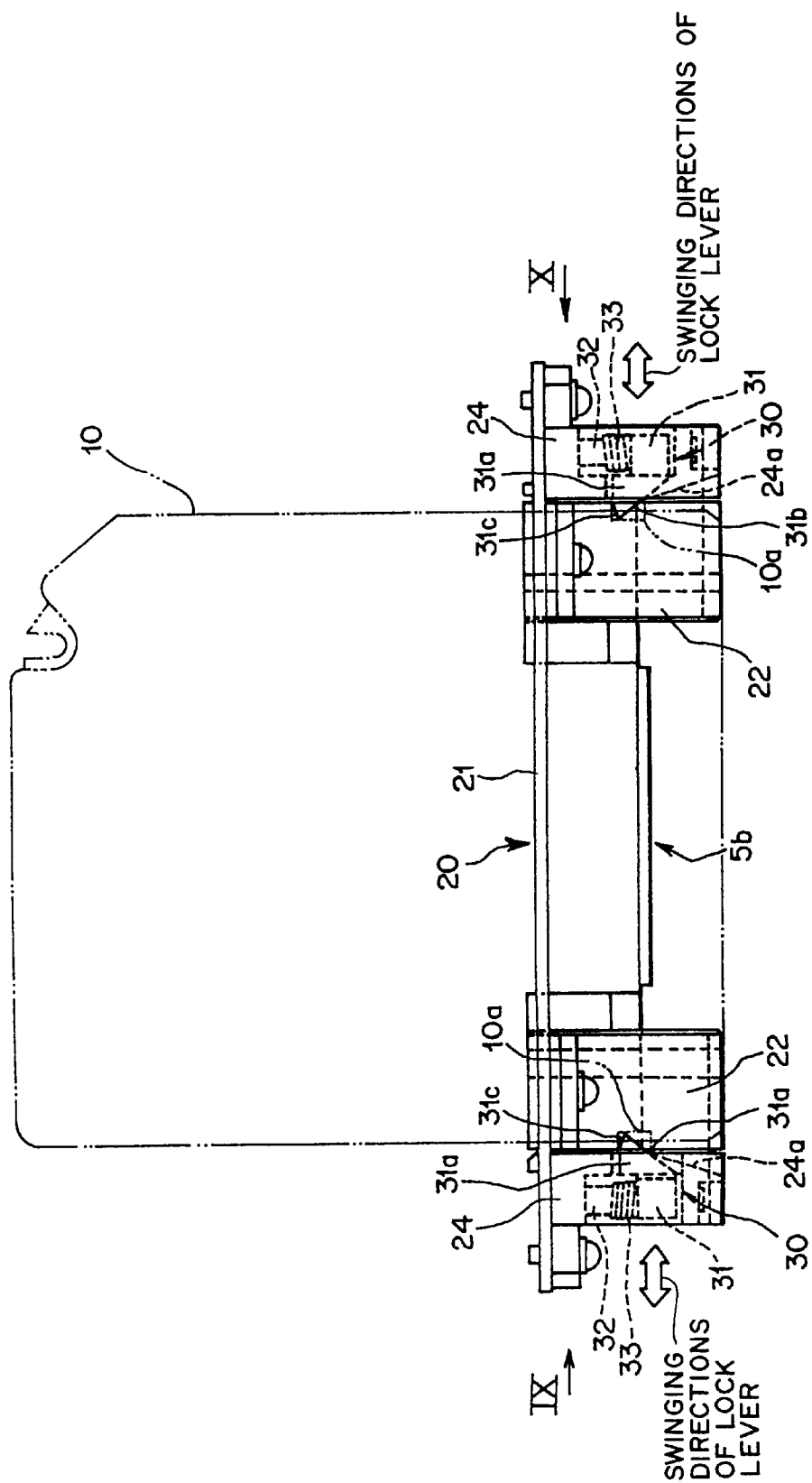
Figure 9:
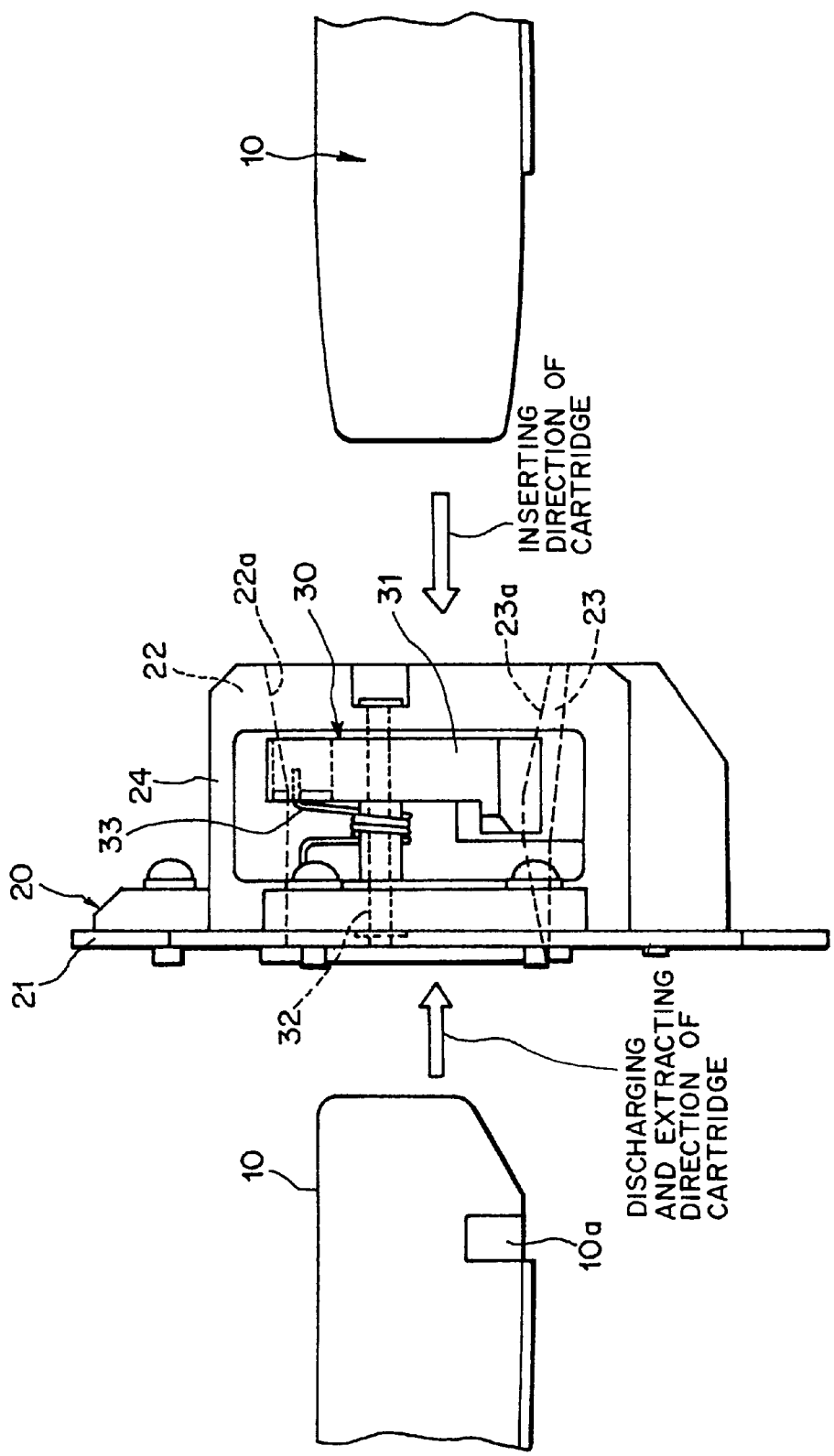
FIGS. 9 and 10 are illustrations of portions pointed out by arrows IX and X of FIG. 8, respectively.
Figure 10:
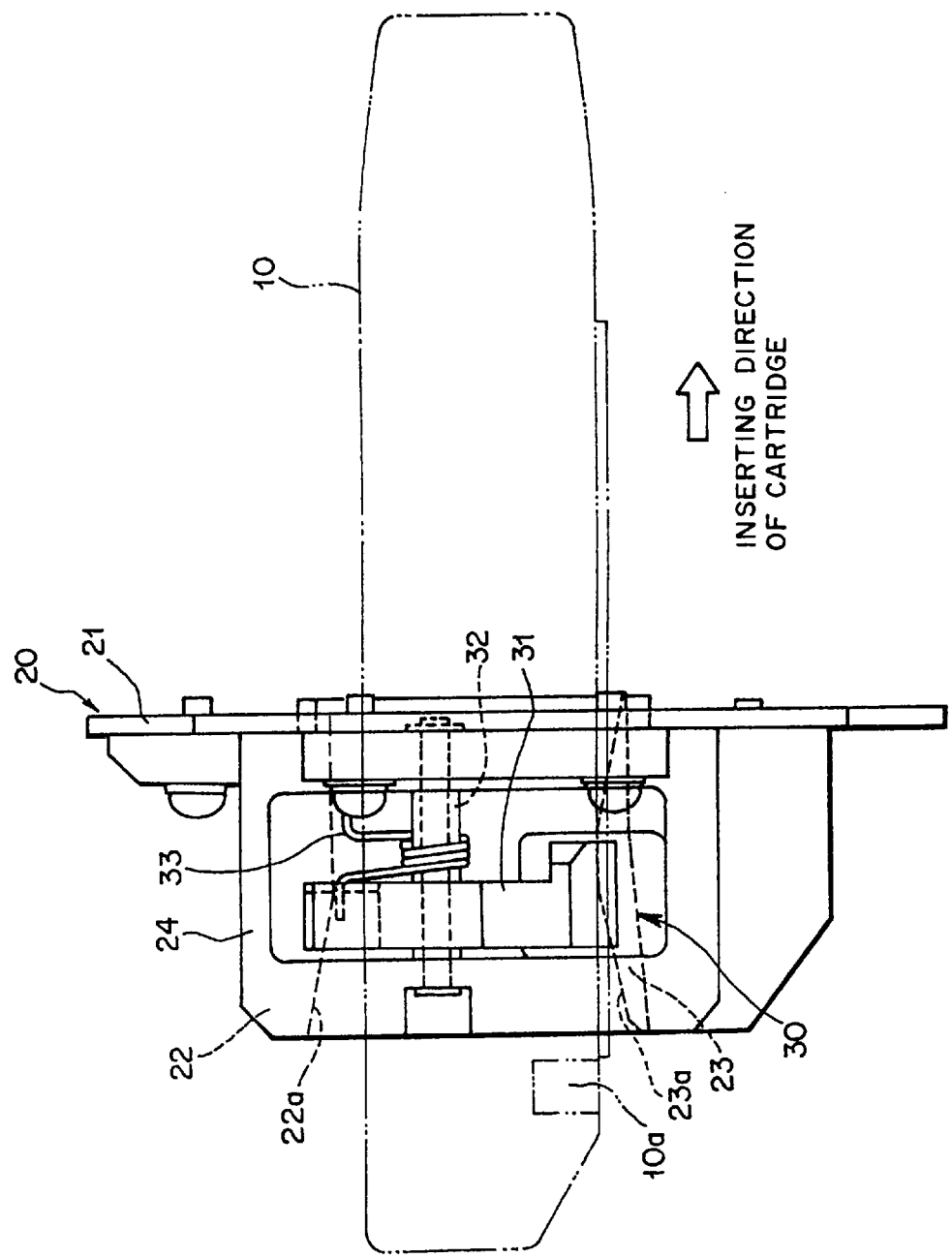
Figure 11:
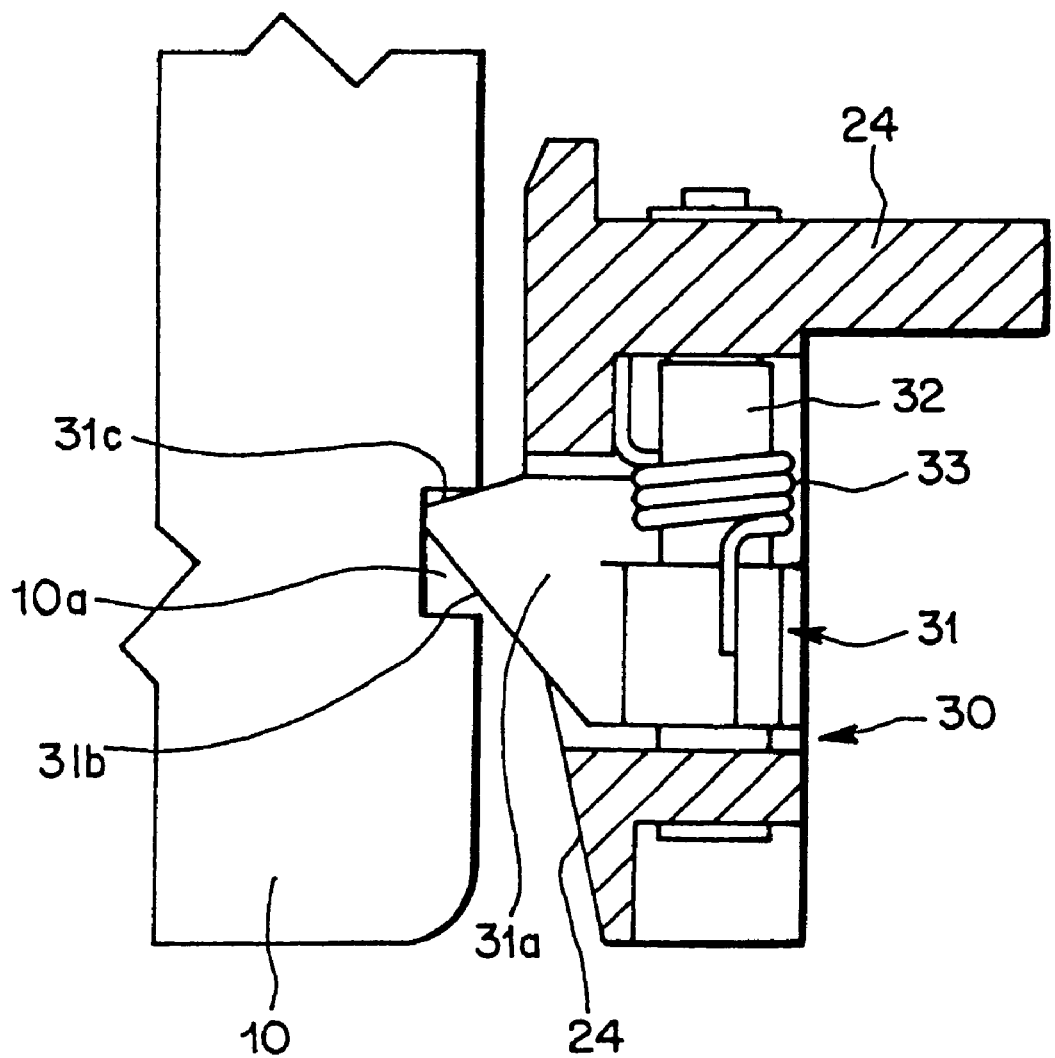
FIG. 11 is an enlarged plan view of a principal portion available for explaining a cartridge locking condition to be taken due to a detent mechanism in this embodiment.

FIGS. 1 and 4 to 11 are illustrations of the cartridge insertion/discharge opening structure according to an embodiment of this invention. In more detail, FIGS. 1, 4 and 5 are respectively a front elevational view, a plan view and a side elevational view each showing a deck having that structure, FIG. 6 is a front elevational view showing the same structure, FIGS. 7 and 8 are respectively a front elevational view and a plan view each showing a principal portion of the structure in this embodiment, FIG. 9 is an illustration of a portion indicated with an arrow IX in FIG. 8, FIG. 10 is an illustration of a portion indicated with an arrow X in FIG. 8, and FIG. 11 is an enlarged plan view showing a principal portion for describing a cartridge locking condition to be taken by a detent mechanism in this embodiment.

As shown in FIGS. 1, 4 and 5, a cartridge insertion/discharge opening section 5b of a deck 5a according to this embodiment is equipped with a cartridge insertion/discharge opening structure (bezel structure) 20.

This cartridge insertion/discharge opening structure 20 is, as shown in FIGS. 1 and 6, composed of a base member 21, introduction guides (guide members) 22 to 24, a reference flag 26 and detent mechanisms 30.

The base member 21 has a frame-like configuration and is attached to an outer circumference of the opening section 5b in the front surface of the deck 5a. After the introduction guides 22 to 24, the reference flag 26, a hand strike portion (Z reference plane) 27 and the detent mechanisms 30 are previously fitted to the base member 21 as shown in FIG. 6, the base member 21 integrally supporting these components is made to be set to the outer circumference of the opening section 5b in the front surface of the deck 5a as shown in FIG. 1.

The base member 21 has a reference flag fitting section 21a formed to extend downwardly, and the reference flag 26 is fitted to a tip portion of the reference flag fitting section 21a in a state of being accurately positioned with respect to the opening section 5b (introduction guides 22 to 24) of the deck 5a. On the reference flag 26 there are cut or drawn an X reference position 26a and a Y reference position 26b whereby the accessor 7 can optically recognize or detect the X and Y positions of the opening section 5b (introduction guides 22 to 24) of the deck 5a.

Furthermore, the hand strike portion 27 is provided as a Z reference plane on a front surface lower portion of the base member 21. In a manner that a hand member(s) of the hand mechanism 7d is directly brought into contact with the hand strike portion 27, the accessor 7 finds the Z position of the opening section 5b (introduction guides 22 to 24) of the deck 5a.

In this embodiment, the X directions correspond to the left- and right-hand directions in FIG. 1 or 6, the Y directions correspond to the vertical directions in FIG. 1 or 6, and the Z directions correspond to the vertical directions in FIG. 4 or the left- and right-hand directions in FIG. 5.

On the other hand, the introduction guides 22, 23, 24 are for the purpose of guiding the cartridge 10, coming from the external through the accessor 7, to the interior of the deck 5a, and as shown in FIGS. 1 and 6 to 10, have tapered surfaces developing from the deck 5a side to the external (that is, tapered surfaces flaring toward the accessor 7 side) 22a, 23a, 24a. In FIG. 7, the formed portions of the tapered surfaces 22a, 23a, 24a of the introduction guides 22, 23, 24 are shaded with oblique lines.

The introduction guides 22, 23, 24 each comprises a pair of guides disposed symmetrically in the left- and right-hand directions. Both the introduction guides 22, 22 are located at left and right positions on the upper side of the opening section 5b, respectively, and serve to guide the upper surface of the cartridge 10 by their tapered surfaces 22a. The introduction guides 23, 23 are located at left and right positions on the lower side of the opening section 5b, respectively, and serve to guide the lower surface of the cartridge 10 by their tapered surfaces 23a. The introduction guides 24, 24 are situated on both sides of the opening section 5b, respectively, and act to guide both side surfaces of the cartridge 10 by their tapered surfaces 24a.

In addition, as shown in FIGS. 6 to 8, hand escape (clearance) spaces 28, 29 for the hand mechanism 7d of the accessor 7 are defined between the upper side introduction guides 22, 22 and between the lower side introduction guides 23, 23, respectively.

The hand mechanism 7d is made up of a pair of upper and lower hand members to be vertically driven, and the cartridge 10 is gripped by the hand mechanism 7d in a manner of being gripped by these hand members from the above and below.

Accordingly, for avoiding the interference of the pair of hand members with the cartridge insertion/discharge opening structure 20 surrounding the opening section 5b in the case that the pair of upper and lower hand members are vertically operated to take an open condition in order to release the cartridge 10 inserted into the opening section 5b or in case where they are vertically driven to assume an open condition in order to grip the cartridge 10 discharged from the deck 5a to the opening section 5b, the cartridge insertion/discharge opening structure 20 according to this embodiment has the hand escape spaces 28, 29 in which the pair of upper and lower hand members come when being in the open condition.

Since in one library apparatus several decks 5a deal with several thousand cartridges 10, the introduction guides 22 to 24 at the opening sections 5b of the decks 5a come directly into contact with the cartridges 10 at a considerably high frequency. For this reason, the introduction guides 22 to 24 are necessary to be made of a material having not only superior strength and abrasion resistance but also a low contact resistance in relation to the cartridge so that the cartridge 10 is always surely guided by the introduction guides 22 to 24.

In this embodiment, the cartridges 10 are one-reel type magnetic tape cartridges, for example, are of I3480 type. Their casings are commonly made of a polycarbonate ($[OC_6H_4C(CH_3)_2C_6H_4OCO]_x$; linear polymer based on carbonic ester, thermoplastic synthetic resin produced using bisphenol and phosgene).

Accordingly, in this embodiment, through a test in which a cartridge 10 having a polycarbonate-made casing is brought into contact with various kinds of materials under a load of approximately 1 kg and repeatedly moved there in the forward and backward directions (moved to reciprocate), a selection was made to the material most suitable for the introduction guides 22 to 24 for guiding the cartridge 10. The materials tested were (1) a stainless, (2) a phosphor bronze, (3) a galvanized steel plate, (4) a nickel-plated steel plate, (5) a steel plate coated with a fluorine-based material, (6) an ABS (acrylonitrile-butadiene-styrene resin), (7) a polyacetal (acetal resin), and (8) a fluorine contained resin. The characteristics thereof shown from the test results are as follows:

(1) stainless : the frictional force rapidly increased after the reciprocating movement was made tens of times, and a resistance like absorption occurred, thus decided as an unsuitable material;

(2) phosphor bronze : abrasion remarkably took place, thus decided as an unsuitable material;

(3) galvanized steel plate:plating came off, thus decided as an inappropriate material;

(4) nickel-plated steel plate the frictional force rapidly increased after the reciprocating movement was made tens of times, and a resistance like absorption occurred, thus decided as an unsuitable material;

(5) steel plate coated with a fluorine-based material coating came off;

(6) ABS : abrasion remarkably occurred, thus decided as inappropriate material;

(7) polyacetal:contact resistance is low, strength/abrasion resistance is excellent, thus decided as a suitable material; and (8) fluorine contained resin:strength is too low to fulfill the guiding functions.

Incidentally, although (1) the stainless and (4) the nickel-plated steel plate are superior in abrasion resistance, they are uncongenial with the polycartronate, and seem to be inappropriate to use for a portion subject to a load exceeding 1 kg.

From the above-mentioned test results, in this embodiment, the introduction guides 22 to 24 are made of a polyacetal (acetal resin, straight-chain synthetic resin; a material synthesized by the addition polymerization of formaldehyde or by the ring scission polymerization of trioxane).

On the other hand, as shown in FIGS. 5 to 10, the detent mechanisms 30, 30 are also paired and disposed symmetrically in the left- and right-hand directions and incorporated into the left and right introduction guides 24, 24, respectively.

Each of the detent mechanisms 30, 30 locks the cartridge 10 discharged from the deck 5a to fulfill a function to prevent the cartridge 10 from jumping out from the opening section 5b and further attains a function as a positioning mechanism to position the cartridge 10 at an appropriate extraction position where the accessor 7 can extract the cartridge 10 at the discharge of the cartridge 10 from the deck 5a.

Furthermore, in this embodiment, each of the detent mechanisms 30, 30 is composed of a lock lever (locking member) 31, a rotary shaft 32 and a spring (biasing member) 33.

The lock lever 31 is attached to the introduction guide 24 to be swingable around the rotary shaft 32. The rotary shaft 32 is placed in a direction parallel to the insertion/extraction directions of the cartridge 10. The tip portion of the lock lever 31 is provided with a claw portion 31a made to protrude from the introduction guide 24 toward the cartridge 10 side. This claw portion 31a is fitted in a groove portion 10a previously made in a side portion of the cartridge 10 discharged from the deck 5a for making the cartridge 10 locked at a given position (the above-mentioned appropriate extraction position) in a positioned condition.

As shown in FIGS. 7 to 11, both the groove portions 10a, 10a made in both the side portions of the cartridge 10 are used for positioning the cartridge 10 when the cartridge 10 is stored in a cell of the storage rack, the CAS 11 or the DEE 12. In a manner that these groove portions 10a, 10a mate with positioning lock members (not shown) placed on the cell of the storage rack, the CAS 11 or the DEE 12, the cartridge 10 is locked and stored at a given position in a positioned condition.

In addition, tapered surfaces 31b, 31c are formed before and after the claw portion 31a. The front side tapered surface 31*b* of the claw portion 31*a* is formed as a surface having an acute angle with respect to a side surface of the cartridge 10 at the insertion into the deck 5*a*, while the rear side tapered surface 31*c* of the claw portion 31*a* is formed as a surface having an obtuse angle relative to the side surface of the cartridge 10 at the insertion into the deck 5*a*. The angles of these tapered surfaces 31*b*, 31*c* are set in accordance with an inserting force by the accessor 7 or a discharging force from the deck 5*a* as will be mentioned herein later.

Still further, the spring 33 is interposed between the introduction guide 24 and the lock lever 31 in a state of being wound around the outer circumference of the rotary shaft 32, and functions to bias the lock lever 31 toward the cartridge 10 side. The biasing force of this spring 33 is determined such that the claw portion 31*a* of the lock lever 31 is put out of the way (retreated) when the accessor 7 performs the insertion/extraction of the cartridge 10 while the claw portion 31*a* of the lock lever 31 is fitted in the groove portion 10*a* to lock the cartridge 10 when the deck 5*a* discharges the cartridge 10. In FIG. 7, solid lines and broken lines denote a state in which the lock lever 31 is put out of the way by the cartridge 10, while two-dot chain lines indicates a state (locked condition or ordinary condition) where the lock lever 31 is not put out of the way.

The cartridge insertion/discharge opening structure 20 according to an embodiment of this invention is constructed as described above, and the following effects are therefore attainable.

At the power-on to the library apparatus 1, the accessor 7 performs the following deck position detecting operations as the initial operations to find the position of the opening section 5*b* (introduction guides 22 to 24) of the deck 5*a*.

That is, an optical sensor (not shown) on the accessor 7 side identifies the X reference position 26*a* and Y reference position 26*b* of the reference flag 26 to detect the X-Y position of the deck 5*a*, and the accessor 7 detects the Z position of the deck 5*a* by bringing the hand member of the hand mechanism 7*d* into contact with the hand strike portion (Z reference plane) 27 on the base member 21, thus storing these X, Y and Z positions in advance.

Thereafter, the accessor 7 carries out the insertion/extraction operations of the cartridge 10 on the basis of the three-dimensional positions of the deck 5*a* detected and stored as mentioned above.

At this time, because of the occurrence of the difference in position between the accessor 7 (hand mechanism 7*d*) and the deck 5*a* or because of a slight discrepancy in the gripping position of the cartridge 10 by the hand mechanism 7*d*, there is a possibility that the difference in position slightly occurs between the cartridge 10 and the deck 5*a*.

In this embodiment, the introduction guides 22 to 24 placed at upper, lower, left and right portions of the opening section 5*b* of the deck 5*a* have the tapered surfaces 22*a* to 24*a* formed to broaden out or develop from the deck 5*a* side to the external. In other words, when viewed from the accessor 7 side, the compartment for the insertion of the cartridge 10 into the deck 5*a* is in an enlarged condition.

Accordingly, even if the discrepancy in position somewhat takes place between the cartridge 10 to be inserted and the opening section 5*b* of the deck 5*a*, the cartridge 10 is brought into contact with the introduction guides 22 to 24 and, hence, is surely inserted into the deck 5*a* while being guided by their tapered surfaces 22*a* to 24*a*. Besides, the accessor 7 can recognize the X and Y positions of the opening section 5*b* (introduction guides 22 to 24) of the deck 5*a* with a high accuracy in a manner of using the reference flag 26 integrated with the introduction guides 22 to 24.

With this arrangement, without the intervention of the cartridge delivering and receiving mechanism taken in the prior art, the direct insertion of the cartridge 10 into the deck 5*a* becomes possible.

Moreover, in this embodiment, in a way of merely attaching the base member 21 (see FIG. 6) previously equipped integrally with the introduction guides 22 to 24, the reference flag 26 and the detent mechanisms 30, to the opening section 5*b* of the deck 5*a*, the introduction guides 22 to 24, the reference flag 26 and the detent mechanisms 30 can accurately and concurrently be disposed at given positions of the opening section 5*b*, which allows the extremely easy realization of the cartridge insertion/discharge opening structure 20 according to this embodiment.

Furthermore, in this embodiment, a polyacetal which provides, in relation to the polycarbonate, excellent strength/abrasion resistance and less contact resistance in the test is employed as a material for the introduction guides 22 to 24.

Thus, even if the introduction guides 22 to 24 come directly into contact with the cartridge 10 at a considerable frequency, the cartridge 10 can certainly be guided into the deck 5*a* at all the times without the occurrence of the problems resulting from the strength or the abrasion.

On the other hand, the lock lever 31 of each of the detent mechanisms 30 is biased by the biasing force of the spring 33 to the inside of the introduction guide 24 (the cartridge 10 side), and the claw portion 31*a* at its tip portion is located to protrude toward the inside of the introduction guide 24.

Furthermore, at the insertion of the cartridge 10, the front side tapered surface 31*b* of the claw portion 31*a* comes into contact with the rear end surface (the left side end surface of the right-hand cartridge 10 in FIG. 9) and side surface of the cartridge 10, so that the lock lever 31 goes to the outside of the introduction guide 24 against the biasing force of the spring 33 to rock around the rotary shaft 32, thereby making the claw portion 31*a* put out of the way (retreated). That is, the lock lever 31 retreats to the outside of the introduction guide 24 in response to being pushed by the cartridge 10.

When the groove portion 10*a* passes through the position of the claw portion 31*a* in accordance with the inserting operation of the cartridge 10, although once mating with the groove portion 10*a*, this claw portion 31*a* is again put out of the way due to the inserting force of the accessor 7. After the cartridge 10 is completely inserted into the interior of the deck 5*a*, the claw portion 31*a* returns to the state of protruding toward the inside of the introduction guide 24.

Besides, in this embodiment, the angle of the tapered surface 31*b* relative to the cartridge 10 side surface is set to minimize the load (the biasing force of the spring 33) against the inserting force of the accessor 7, with the result that the accessor 7 can easily and certainly accomplish the insertion of the cartridge 10.

Still further, the cartridge 10 discharged from the deck 5*a* advances while pressing the rear side tapered surface 31*c* of the claw portion 31*a*, and after the completely discharged condition, comes into the locked and held condition in a manner that the claw portion 31*a* at the tip portion of the returned lock lever 31 comes in the groove portion 10*a* as shown in FIG. 11.

More specifically, in this embodiment, the biasing force of the spring 33 is set so that, although owing to the discharging force of the deck 5*a* the cartridge 10 reaches the position where the claw portion 31*a* engages with the groove portion 10*a*, the claw portion 31*a* is inhibited from being again put out of the way against the biasing force of the spring 33.

Accordingly, as a result of only discharging the cartridge 10 from the deck 5*a*, as shown in FIG. 11, the cartridge 10 is stopped in the locked condition where the claw portion 31a engages with the groove portion 10a and locked with the claw portion 31a, thus surely preventing the cartridge 10 from jumping out toward the external or dropping due to vibrations or the like. In addition, when taking the locked condition in which the claw portion 31a is fitted in the groove portion 10a, the cartridge 10 is made to be positioned at an appropriate insertion/extraction position where the insertion/extraction of the cartridge 10 is achievable by the accessor 7.

The cartridge 10 held in the condition of being locked by the claw portion 31a as mentioned above is gripped and pulled out by the hand mechanism 7d of the accessor 7.

At that pulling-out operation, the rear side tapered surface 31c of the claw portion 31a is placed into contact with the groove portion and side surface of the cartridge 10, and hence, as in the case of the insertion operation, the lock lever 31 advances toward the outside of the introduction guide 24 against the biasing force of the spring 33 to rock around the rotary shaft 32, thus causing the claw portion 31a to be put out of the way. Further, when the cartridge 10 is completely pulled out from the deck 5a, the claw portion 31a returns to the condition of protruding the inside of the introduction guide 24. Thus, at the extraction of the cartridge 10 by the accessor 7, the claw portion 31a is completely put out of the way against the biasing force of the spring 33 to allow the extraction of the cartridge 10 to be done without any troubles.

In this embodiment, the biasing force of the spring 33 and the angle of the tapered surface 31c of the claw portion 31a are determined so that the load for retreating the lock lever 31 to the outside of the introduction guide 24 is below the discharging force of the deck 5a or the extracting force of the accessor 7 and a load works on the cartridge 10 to prevent the cartridge 10 from jumping out or dropping due to vibrations or the like in the cartridge 10 held condition (locked condition) shown in FIG. 11.

The installation and use of the above-described detent mechanisms 30 can surely prevent the cartridge 10 from jumping out toward the exterior at its discharge or from dropping due to vibrations or the like, and further can always position the cartridge 10, discharged from the deck 5a, at a constant extraction position, with the result that, without the intervention of the cartridge delivering and receiving mechanism taken in the prior art, the direct extraction of the cartridge 10 from the deck 5a is possible through the use of the accessor 7.

Thus, according to the cartridge insertion/discharge opening structure 20 and the library apparatus 1 constituting the embodiments of this invention, the accessor 7 can surely carry out the direct insertion/extraction of the cartridge 10 into/from the deck 5a, and hence, without the installation of the cartridge delivering and receiving mechanism in each of the decks 5a, the insertion/extraction of the cartridge 10 into/from the each of the decks 5a is directly feasible by the hand mechanism 7d, which contributes to the size reduction (the reduction of the mounting space and the simplification of the system) and cost reduction of the library apparatus 1.

Since in the prior art the cartridge delivering and receiving mechanism is interposed between the accessor 7 and each of the decks 5a and an cartridge insertion/discharge opening of the cartridge delivering and receiving mechanism takes an open condition and shifts, even though a positional discrepancy somewhat occurs between the accessor 7 (the cartridge 10 gripped by the hand mechanism 7d) and the cartridge delivering and receiving mechanism, through the use of the cartridge delivering and receiving mechanism, the accessor 7 can surely carry out the insertion/extraction of the cartridge 10 into/from the deck 5a.

On the other hand, in the case that the accessor 7a directly performs the insertion/extraction of the cartridge 10 into/from the deck 5a without the intervention of the cartridge delivering and receiving mechanism, if the positional discrepancy takes place even by a little amount between the accessor 7 (the cartridge 10) and the deck 5a, chances are that this discrepancy refuses the insertion/extraction of the cartridge 10.

However, in this embodiment, even though the difference in position somewhat occurs between the cartridge 10 and the opening section 5b of the deck 5a, the cartridge 10 can securely be inserted through the opening section 5b into the deck 5a while being guided by the tapered surfaces 22a to 24a after coming into contact with the introduction guides 22 to 24, thus insuring the direct insertion/extraction of the cartridge 10 into/from each of the decks 5a.

For this reason, this structure does not require a high positioning precision of the cartridge 10 with respect to the deck 5a, which leads to a low-cost and compact (small-sized) arrangement of the library apparatus 1. That is, even if not enhancing the dimension of the library apparatus 1 up to a high precision, since the direct insertion/extraction of the cartridge 10 into/from the deck 5a is feasible, the library apparatus 1 can be of the type coupling a plurality of lockers (units) 2 to 6, which allows extremely lowering the cost of the library apparatus 1.

Furthermore, according to this embodiment, in the case of discharging the cartridge 10 from the deck 5a without the use of the cartridge delivering and receiving mechanism, the detent mechanism 30 can place the cartridge 10 at a given position while preventing the cartridge 10 from jumping out to the exterior due to the discharging force of the deck 5a or from falling out due to vibrations or the like, with the result that the accessor 7 can securely pick up the cartridge 10 exiting from the deck 10.

Still further, according to this embodiment, the employment of the reference flag allows the accurate detection of the positional relation between the accessor 7 and the deck 5a at the initial operation coming from the turning-on of the power supply and others, and therefore, there is a further advantage of ensuring more certain insertion/extraction of the cartridge 10 through the accessor 7 into/from the deck 5a.

It should be understood that the present invention is not limited to the above-described embodiment, and that it is intended to cover all changes and modifications of the embodiment of the invention herein used for the purpose of the disclosure, which do not constitute departures from the spirit and scope of the invention.

What is claimed is:

1. A cartridge insertion/discharge opening structure of a recording/reproduction unit for use in a library apparatus that includes a storage unit for storing a number of cartridges, each accommodating a storage medium, and a transferring mechanism for transferring the cartridges, the recording/reproduction unit having an opening section that allows a selective one of the cartridges to be inserted into and extracted from the recording/reproduction unit by the transferring mechanism and being operable to perform a recording/reproduction process on the storage medium in the one cartridge, said structure comprising:

a base member attached to the recording/reproduction unit and defining an opening substantially corresponding to the opening section of the recording/reproduction unit;

a guide member attached to said base member for guiding the one cartridge to be inserted into the recording/ reproduction unit by the transferring mechanism, said guide member having a tapered surface that converges toward the opening of said base member and having a pair of clearance portions opposite to each other across the opening of said base member so as to allow a hand mechanism of the transferring mechanism to grip or release the one cartridge when the one cartridge is inserted into and extracted from the recording/reproduction unit by the transferring mechanism.

2. A cartridge insertion/discharge opening structure of a recording/reproduction unit for use in a library apparatus as defined in claim 1, wherein said guide member further comprises a reference flag attached to said guide member for allowing the transferring mechanism to recognize a position of the opening section of the recording/reproduction unit when the one cartridge is inserted into the recording/reproduction unit by the transferring mechanism.

3. A cartridge insertion/discharge opening structure of a recording/reproduction unit for use in a library apparatus as defined in claim 2, wherein said guide member, said reference flag and said base member are formed as a unit.

4. A cartridge insertion/discharge opening structure of a recording/reproduction unit for use in a library apparatus as defined in claim 3, further comprising a detent mechanism for locking the one cartridge to prevent the one cartridge from jumping out of the recording/reproduction unit when the one cartridge is discharged from the recording/reproduction unit.

5. A cartridge insertion/discharge opening structure of a recording/reproduction unit for use in a library apparatus as defined in claim 4, wherein said detent mechanism comprises:
   a locking member protruding from said guide member to the cartridge side for locking the one cartridge; and
   a biasing member for biasing said locking member to the cartridge side;
   wherein a biasing force of said biasing member is controlled so that said locking member is put out of the way at the insertion/extraction of the one cartridge by the transferring mechanism while said locking member locks the one cartridge at the discharge of the one cartridge by the recording/reproduction unit.

6. A cartridge insertion/discharge opening structure of a recording/reproduction unit for use in a library apparatus as defined in claim 5, wherein, when the one cartridge is discharged from the recording/reproduction unit, said detent mechanism is operable to serve as a positioning mechanism for stopping the one cartridge at an appropriate extraction position at which the transferring mechanism carries out the extraction of the one cartridge.

7. A cartridge insertion/discharge opening structure of a recording/reproduction unit for use in a library apparatus as defined in claim 4, wherein, when the one cartridge is discharged from the recording/reproduction unit, said detent mechanism is operable to serve as a positioning mechanism for stopping the one cartridge at an appropriate extraction position at which the transferring mechanism carries out the extraction of the one cartridge.

8. A cartridge insertion/discharge opening structure of a recording/reproduction unit for use in a library apparatus as defined in claim 2, further comprising a detent mechanism for locking the one cartridge to prevent the one cartridge from jumping out of the recording/reproduction unit when the one cartridge is discharged from the recording/reproduction unit.

9. A cartridge insertion/discharge opening structure of a recording/reproduction unit for use in a library apparatus as defined in claim 8, wherein said detent mechanism comprises:
   a locking member protruding from said guide member to the cartridge side for locking the one cartridge; and
   a biasing member for biasing said locking member to the cartridge side;
   wherein a biasing force of said biasing member is controlled so that said locking member is put out of the way at the insertion/extraction of the one cartridge by the transferring mechanism while said locking member locks the one cartridge at the discharge of the one cartridge by the recording/reproduction unit.

10. A cartridge insertion/discharge opening structure of a recording/reproduction unit for use in a library apparatus as defined in claim 9, wherein, when the one cartridge is discharged from the recording/reproduction unit, said detent mechanism is operable to serve as a positioning mechanism for stopping the one cartridge at an appropriate extraction position at which the transferring mechanism carries out the extraction of the one cartridge.

11. A cartridge insertion/discharge opening structure of a recording/reproduction unit for use in a library apparatus as defined in claim 8, wherein, when the one cartridge is discharged from the recording/reproduction unit, said detent mechanism is operable to serve as a positioning mechanism for stopping the one cartridge at an appropriate extraction position at which the transferring mechanism carries out the extraction of the one cartridge.

12. A cartridge insertion/discharge opening structure of a recording/reproduction unit for use in a library apparatus as defined in claim 1, further comprising a detent mechanism for locking the one cartridge to prevent the one cartridge from jumping out of the recording/reproduction unit when the one cartridge is discharged from the recording/reproduction unit.

13. A cartridge insertion/discharge opening structure of a recording/reproduction unit for use in a library apparatus as defined in claim 12, wherein said detent mechanism comprises:
   a locking member protruding from said guide member to the cartridge side for locking the one cartridge; and
   a biasing member for biasing said locking member to the cartridge side;
   wherein a biasing force of said biasing member is controlled so that said locking member is put out of the way at the insertion/extraction of the one cartridge by the transferring mechanism while said locking member locks the one cartridge at the discharge of the one cartridge by the recording/reproduction unit.

14. A cartridge insertion/discharge opening structure of a recording/reproduction unit for use in a library apparatus as defined in claim 13, wherein, when the one cartridge is discharged from the recording/reproduction unit, said detent mechanism is operable to serve as a positioning mechanism for stopping the one cartridge at an appropriate extraction position at which the transferring mechanism carries out the extraction of the one cartridge.

15. A cartridge insertion/discharge opening structure of a recording/reproduction unit for use in a library apparatus as defined in claim 12, wherein, when the one cartridge is discharged from the recording/reproduction unit, said detent mechanism is operable to serve as a positioning mechanism for stopping the one cartridge at an appropriate extraction position at which the transferring mechanism carries out the extraction of the one cartridge.

16. A library apparatus comprising:
   a storage unit for storing a number of cartridges each accommodating a storage medium;

a transferring mechanism for transferring the cartridges;

a recording/reproduction unit having an opening section that allows a selective one of the cartridges to be inserted into said recording/reproduction unit by said transferring mechanism and being operable to perform a recording/reproduction process on the storage medium in the one cartridge, said recording/reproduction unit has an opening structure comprising:

a base member attached to said recording/reproduction unit and defining an opening substantially corresponding to the opening section of said recording/reproduction unit;

a guide member attached to said base members for guiding the one cartridge to be inserted into said recording/reproduction unit by said transferring mechanism, said guide member having a tapered surface that converges toward the opening of said base member and having a pair of clearance portions opposite to each other across the opening of said base member to allow the hand mechanism to grip or release the one cartridge when the one cartridge is inserted into/or extracted from said recording/reproduction unit by said transferring mechanism.

17. A library apparatus as defined in claim 16, wherein said guide member further comprises a reference flat attached to said guide member for allowing said transferring mechanism to recognize a position of the opening section of said recording/reproduction unit when the one cartridge is inserted into said recording/reproduction unit by said transferring mechanism.

18. A library apparatus as defined in claim 17, wherein said structure further comprises a detent mechanism for locking the one cartridge to prevent the one cartridge from jumping out of said recording/reproduction unit when the one cartridge is discharged from said recording/reproduction unit.

19. A library apparatus as defined in claim 18, wherein said detent mechanism comprises:

a locking member protruding from said guide member to the cartridge side for locking the one cartridge; and a biasing member for biasing said locking member to the cartridge side;

wherein a biasing force of said biasing member is controlled so that said locking member is put out of the way at the insertion/extraction of the one cartridge by said transferring mechanism while said locking member locks the one cartridge at the discharge of the one cartridge by said recording/reproduction unit.

20. A library apparatus as defined in claim 19, wherein, when the one cartridge is discharged from said recording/reproduction unit, said detent mechanism is operable to serve as a positioning mechanism for stopping the one cartridge at an appropriate extraction position at which said transferring mechanism carries out the extraction of the one cartridge.

21. A library apparatus as defined in claim 18, wherein, when the one cartridge is discharged from said recording/reproduction unit, said detent mechanism is operable to serve as a positioning mechanism for stopping the one cartridge at an appropriate extraction position at which said transferring mechanism carries out the extraction of the one cartridge.

22. A library apparatus as defined in claim 17, wherein said guide member, said reference flag and said base member are formed as a unit.

23. A library apparatus as defined in claim 22, wherein said structure further comprises a detent mechanism for locking the one cartridge to prevent the one cartridge from jumping out of said recording/reproduction unit when the one cartridge is discharged from said recording/reproduction unit.

24. A library apparatus as defined in claim 23, wherein said detent mechanism comprises:

a locking member protruding from said guide member to the cartridge side for locking the one cartridge; and a biasing member for biasing said locking member to the cartridge side;

wherein a biasing force of said biasing member is controlled so that said locking member is put out of the way at the insertion/extraction of the one cartridge by said transferring mechanism while said locking member locks the one cartridge at the discharge of the one cartridge by said recording/reproduction unit.

25. A library apparatus as defined in claim 24, wherein, when the one cartridge is discharged from said recording/reproduction unit, said detent mechanism is operable to serve as a positioning mechanism for stopping the one cartridge at an appropriate extraction position at which said transferring mechanism carries out the extraction of the one cartridge.

26. A library apparatus as defined in claim 23, wherein, when the one cartridge is discharged from said recording/reproduction unit, said detent mechanism is operable to serve as a positioning mechanism for stopping the one cartridge at an appropriate extraction position at which said transferring mechanism carries out the extraction of the one cartridge.

27. A library apparatus as defined in claim 16, wherein said structure further comprises a detent mechanism for locking the one cartridge to prevent the one cartridge from jumping out of said recording/reproduction unit when the one cartridge is discharged from said recording/reproduction unit.

28. A library apparatus as defined in claim 27, wherein said detent mechanism comprises:

a locking member protruding from said guide member to the cartridge side for locking the one cartridge; and a biasing member for biasing said locking member to the cartridge side;

wherein a biasing force of said biasing member is controlled so that said locking member is put out of the way at the insertion/extraction of the one cartridge by said transferring mechanism while said locking member locks the one cartridge at the discharge of the one cartridge by said recording/reproduction unit.

29. A library apparatus as defined in claim 28, wherein, when the one cartridge is discharged from said recording/reproduction unit, said detent mechanism is operable to serve as a positioning mechanism for stopping the one cartridge at an appropriate extraction position at which said transferring mechanism carries out the extraction of the one cartridge.

30. A library apparatus as defined in claim 27, wherein, when the one cartridge is discharged from said recording/reproduction unit, said detent mechanism is operable to serve as a positioning mechanism for stopping the one cartridge at an appropriate extraction position at which said transferring mechanism carries out the extraction of the one cartridge.

* * * * *

UNITED STATES PATENT AND TRADEMARK OFFICE
CERTIFICATE OF CORRECTION

PATENT NO.   : 6,195,223 B1
DATED        : February 27, 2001
INVENTOR(S)  : Kanetsuku et al.

It is certified that error appears in the above-identified patent and that said Letters Patent is hereby corrected as shown below:

<u>Column 17,</u>
Line 25, delete "flat" and insert -- flag -- therefor.

Signed and Sealed this

Twenty-first Day of October, 2003

JAMES E. ROGAN
*Director of the United States Patent and Trademark Office*